United States Patent [19]
Brown et al.

[11] Patent Number: 5,892,826
[45] Date of Patent: Apr. 6, 1999

[54] DATA PROCESSOR WITH FLEXIBLE DATA ENCRYPTION

[75] Inventors: David L. Brown, Miami, Fla.; Raul A. Pombo, Grayslake, Ill.; Paul J. Polansky, Dripping Springs, Tex.

[73] Assignee: Motorola, Inc., Schaumburg, Ill.

[21] Appl. No.: 593,987

[22] Filed: Jan. 30, 1996

[51] Int. Cl.[6] ............................. H04L 9/00; G06F 12/14
[52] U.S. Cl. ............................. 380/4; 395/186; 380/3; 707/103
[58] Field of Search .......... 380/4, 50, 3; 395/186, 395/490; 364/222.5; 711/100–103

[56] References Cited

U.S. PATENT DOCUMENTS

| | | | |
|---|---|---|---|
| 4,120,030 | 10/1978 | Johnstone | 380/4 |
| 4,168,396 | 9/1979 | Best | 380/4 |
| 4,278,837 | 7/1981 | Best | 380/4 |
| 4,573,119 | 2/1986 | Westheimer et al. | 380/4 |
| 4,583,196 | 4/1986 | Koo | 395/186 |
| 4,633,388 | 12/1986 | Chiu | 380/4 X |
| 5,058,164 | 10/1991 | Elmer et al. | 380/50 |
| 5,155,829 | 10/1992 | Koo | 395/490 |
| 5,214,701 | 5/1993 | Quisquater et al. | 380/29 |
| 5,224,166 | 6/1993 | Hartman, Jr. | 380/50 |
| 5,249,232 | 9/1993 | Erbes et al. | 380/49 |
| 5,251,304 | 10/1993 | Sibigtroth et al. | 395/186 |
| 5,343,525 | 8/1994 | Hung et al. | 380/4 |
| 5,513,262 | 4/1996 | Van Rumpt et al. | 380/29 |

FOREIGN PATENT DOCUMENTS

| | | | |
|---|---|---|---|
| 2276254 | 9/1994 | United Kingdom | G06F 12/14 |

*Primary Examiner*—Gail O. Hayes
*Assistant Examiner*—Pinchus M. Laufer
*Attorney, Agent, or Firm*—Paul J. Polansky

[57] ABSTRACT

A data processor (20) which flexibly encrypts data within different address ranges includes an encryption determination circuit (50) to monitor an address conducted on an internal address bus (22) and when the address is within certain predefined ranges, perform encryption or decryption of address and/or data. For example the encryption determination circuit (50) may be used to selectively enable a data encryption-decryption circuit (60). When the data encryption-decryption circuit (60) is disabled, data conducted on an internal data bus (23) becomes "cleartext", i.e., non-encrypted. In one embodiment, the data encryption-decryption is performed in partial dependence on the address itself, and the address conducted to the external address bus is itself selectively encrypted as well.

5 Claims, 3 Drawing Sheets

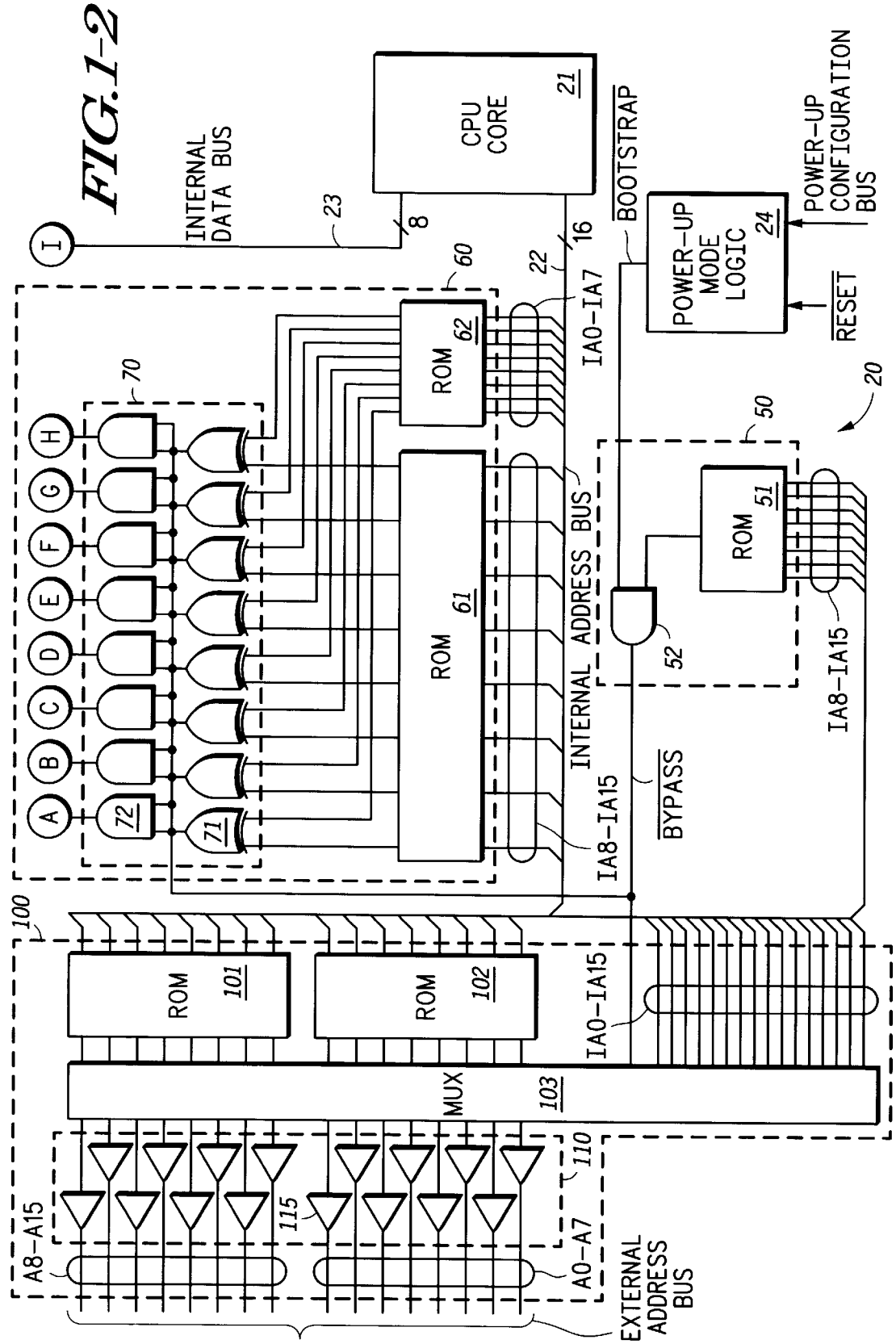

DATA PROCESSOR WITH FLEXIBLE DATA ENCRYPTION

FIELD OF THE INVENTION

This invention relates generally to data processors, and more particularly, to data processors which encrypt or decrypt data.

BACKGROUND OF THE INVENTION

Computer systems are classically defined as having three main blocks: central processing unit (CPU), memory, and input/output peripherals. Microcontrollers, which are also known as microcomputers or embedded controllers, incorporate all three of these blocks onto a single integrated circuit chip. Microcontrollers are used for a variety of control applications such as microwave ovens, television remote controllers, cellular telephones, and the like. Depending on the application, the microcontroller may either be able to have all program code on-chip, or it may have some program code on-chip and some program code off-chip. For these applications, some microcontrollers are designed to operate in an "expanded mode", in which address and data signals are present on integrated circuit pins and thus the microcontroller can access some program code off-chip.

In certain applications it is important to protect the program code from reverse engineering or "hacking". While this program code may be protected from legal copying through copyright laws, additional measures are required to prevent "hackers" from illegally copying and redistributing this code. If the program code is located in an off-chip memory, a hacker may simply pull the program memory chips out of their sockets and read out their data using separate hardware. If the program code is completely on-chip, hacking at least becomes more difficult. However well-known integrated circuit reverse engineering techniques allow the contents of this on-chip program memory to be determined relatively easily as well. Furthermore in many applications in which the software is complicated, such as cellular telephones, the code is usually too large to fit completely on-chip. Thus part of the program code must be located off-chip and the microcontroller must access it in expanded mode. In order to protect this valuable code which may be partially off-chip, certain microcontrollers have implemented address and data encryption techniques.

Address encryption consists generally of scrambling the physical locations within the microcontroller's internal memory so that hackers cannot read out the code by determining the logic states of memory cells and knowing the sequence due to the physical location of the memory cells. Data encryption includes both encryption and decryption. Data is encrypted when it is passed from the internal memory to external memory, and decrypted when it is read from external memory into the CPU or internal memory. There are many well known encryption schemes which use mathematical transformations and may even use the address location of the data as part of the transformation.

With regard to program instructions and data which are stored in external memory but which are brought on-chip as the program demands, encryption is a valuable tool in making it more difficult to hack a program. The programmer knows the encryption scheme and is able to store the program in the external memory chips in encrypted form. However these microcontrollers are frequently connected to external peripherals as well. For example, the data processor might need to drive a seven-segment display or read data from a terminal. In that case, encryption presents a couple of problems. First, encryption would increase the cost of system elements if they too had to include encryption and/or decryption circuitry. Second, the microcontroller manufacturer may have to disclose the encryption techniques used on the microcontroller to the manufacturer of the peripheral, which would increase the chance that the encryption scheme will leak out. What is needed, then, is a data processor such as a microcontroller which has a more flexible encryption scheme to allow for external peripherals. The present invention provides such a data processor, whose features and advantages will be more clearly understood from the following detailed description taken in conjunction with the accompanying drawings.

BRIEF DESCRIPTION OF THE DRAWINGS

FIG. 2 illustrates in partial block diagram and partial logic diagram form a data processor according to another embodiment of the present invention.

DETAILED DESCRIPTION OF A PREFERRED EMBODIMENT

According to the present invention, a user may flexibly encrypt data and scramble addresses for accesses of a microcontroller in an expanded mode by defining portions of the address space which are to be encrypted/decrypted. The determination is made by an encryption determination circuit which is responsive to a portion of the address to cause a data encryption-decryption circuit, or alternatively an address encryption circuit, to be selectively bypassed. The encryption determination circuit is responsive to an address on the address bus, and preferably a certain number of most significant address bits, to make this determination. This partitioning of the address space allows certain input/output peripherals or memory devices to be accessed with "cleartext", i.e. non-encrypted data, while allowing other portions, such as a program stored in an external memory, to remain encrypted.

Figure 1:
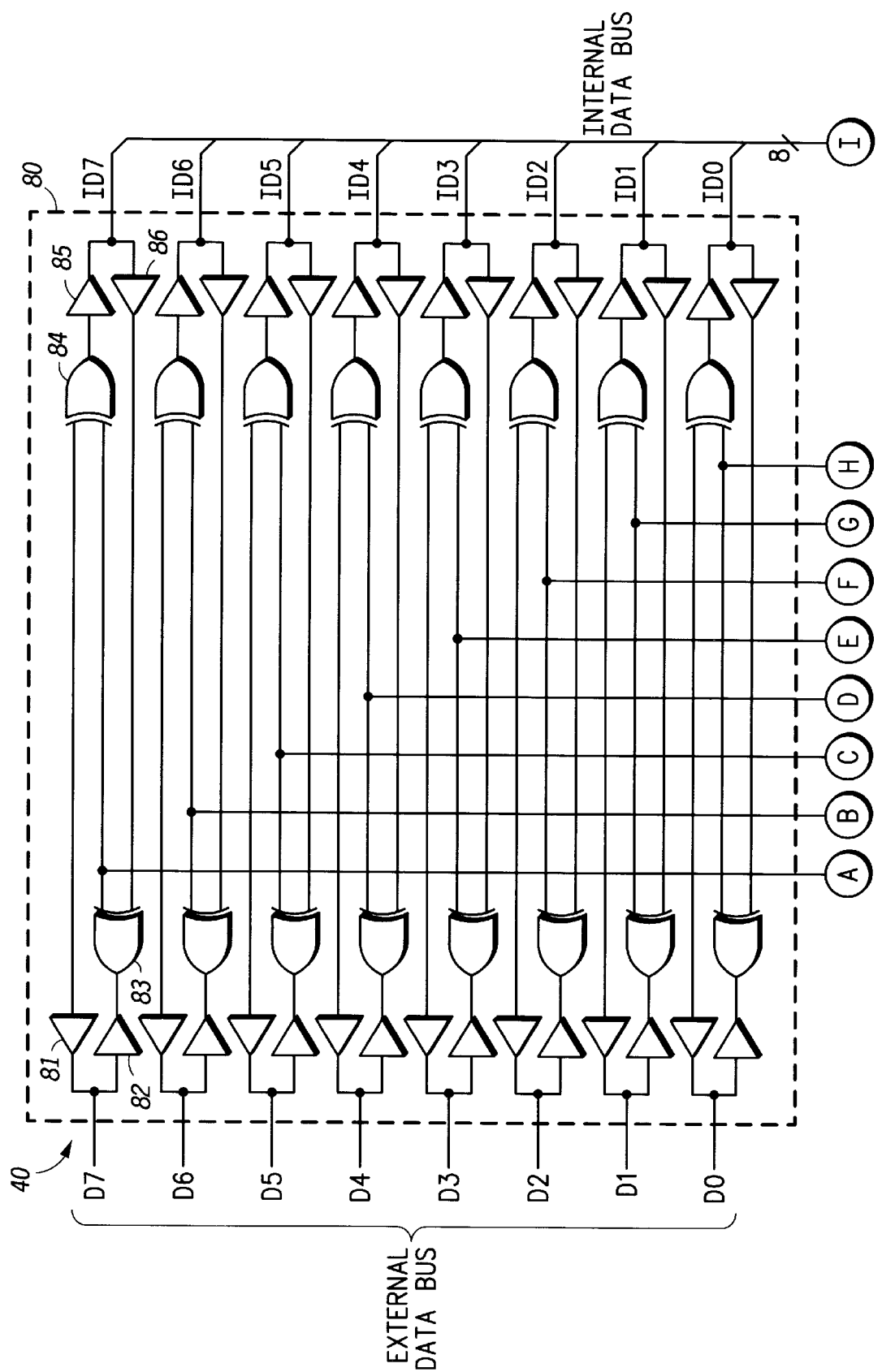
FIGS. 1-1 and 1-2 collectively illustrate in partial block diagram and partial logic diagram form a data processor according to the present invention.
Figure 2:
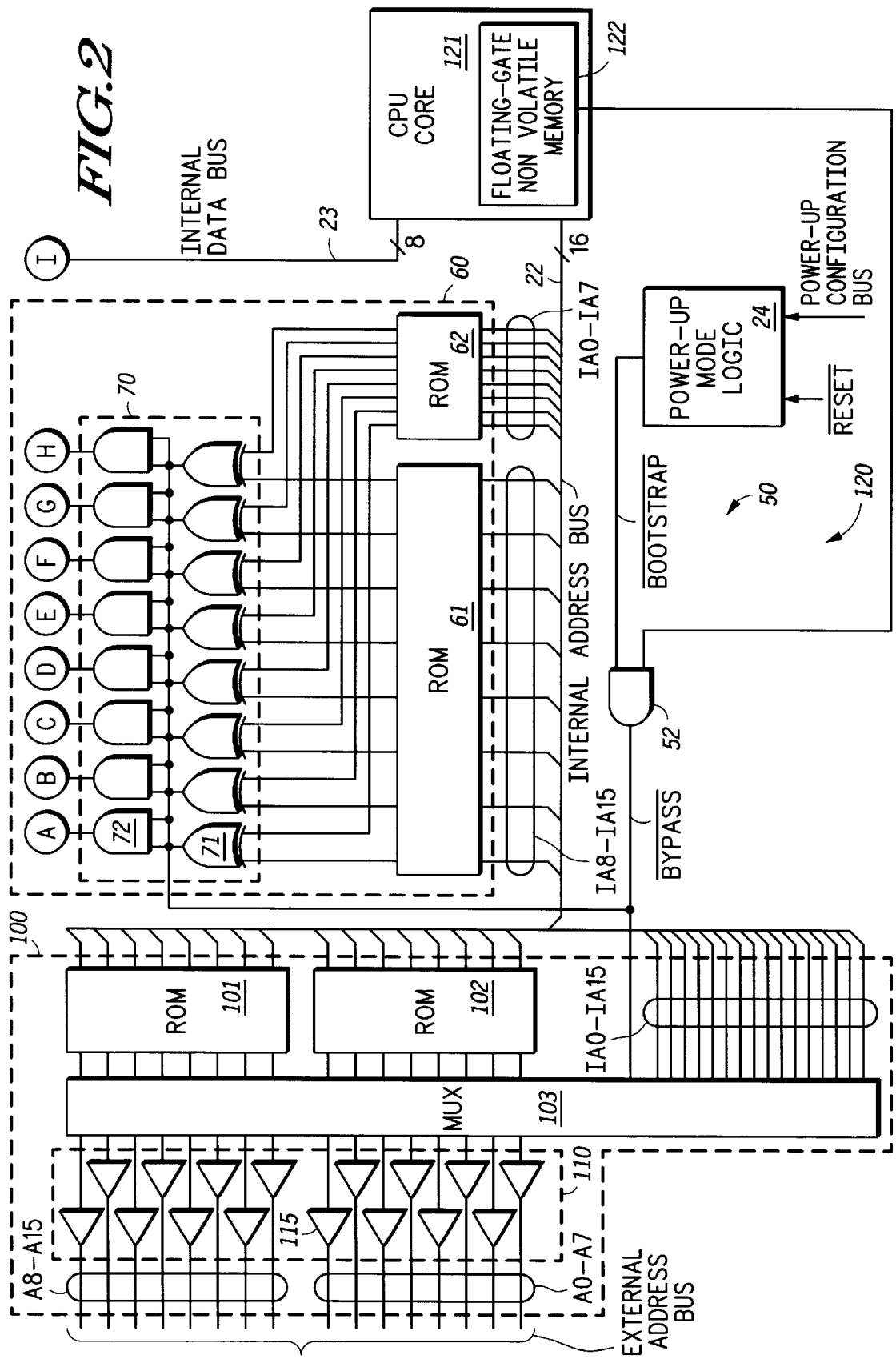

This invention is understood with reference to FIGS. 1-1 and 1-2, which collectively form FIG. 1 and illustrate in partial block diagram and partial logic diagram form a data processor 20 according to the present invention. Data processor 20 includes generally a central processing unit (CPU) core 21, an internal address bus 22, an internal data bus 23, a power-up mode logic circuit 24, an encryption determination circuit 50, a data encryption-decryption circuit 60, and an address encryption circuit 100.

CPU core 21 is a central processing unit having an 8-bit address path and a 16-bit data path and is capable of processing instructions and accessing data through the address and data paths which are respectively coupled to internal address bus 22 and internal data bus 23. While the present invention is not limited to any particular type of CPU, data bus size, or address bus size, CPU core 21 is preferably an MC68HC11 microcontroller available from Motorola, Inc., or a comparable microcontroller. Thus, other features conventionally associated with microcontrollers in general and the MC68HC11 microcontroller in particular such as on-chip memory and peripherals are omitted from the FIG. 1 for ease of illustration. Note that if data processor includes special "glue logic" circuitry for generating chip select signals, this logic is preferably placed after address scrambling.

Power-up mode logic circuit 24 has a control input for receiving a signal labelled "$\overline{\text{RESET}}$", an input for receiving "POWER-UP CONFIGURATION BITS", and an output for providing a signal labelled "$\overline{\text{BOOTSTRAP}}$". Power-up mode logic circuit 24 allows data processor 20 to enter certain modes after signal $\overline{\text{RESET}}$ is activated. In the case of the MC68HC11F1 microcontroller available from Motorola, Inc., these modes include single-chip mode, expanded non-multiplexed mode, special bootstrap mode, and special test mode. Thus, power-up mode logic circuit 24 activates signal $\overline{\text{BOOTSTRAP}}$ when the POWER-UP CONFIGURATION BITS select the special bootstrap mode. In the bootstrap mode, a resident program allows an external program to be loaded through a serial port into the internal RAM.

Encryption determination circuit 50 has an input terminal for receiving the eight most significant bits of the internal address, labelled "IA8–IA15", a control input terminal for receiving signal $\overline{\text{BOOTSTRAP}}$, and an output terminal for providing a signal labelled "$\overline{\text{BYPASS}}$". Encryption determination circuit 50 may be implemented with conventional combinational logic circuitry, but may also be implemented as shown in FIG. 1 with a read-only memory (ROM) 51. ROM 51 has address input terminals for receiving signals IA8–IA15, and a single output terminal. ROM 51 is a 256-by-1 ROM which responds to different combinations of the address to provide the single-bit output signal indicative of whether the address encryption and data encryption/decryption is to be performed. In order to allow for cleartext to be conducted during certain operating modes, encryption determination circuit 50 also includes an AND gate 52. AND gate 52 has a first input terminal connected to the output terminal of ROM 51, a second input terminal for receiving signal $\overline{\text{BOOTSTRAP}}$, and an output terminal for providing signal $\overline{\text{BYPASS}}$. Thus, address encryption and data encryption/decryption may be selectively bypassed either in certain startup modes or in certain ranges of the address.

Note that it is generally preferable for instructions stored off-chip to be encrypted to prevent easy disassembly. Thus, instruction code will generally not be cleartext. Note also that ROM 51 may alternatively be random access memory (RAM) or random logic. However, it may also be desirable to further protect data processor 20 from reverse engineering by preventing a "hacker" from determining which sections of memory are encrypted and which sections are in cleartext. In order to achieve this objective ROM 51 may be replaced by nonvolatile memory based on floating-gate technology. Examples of such nonvolatile memory include erasable programmable ROM (EPROM), electrically erasable programmable ROM (EEPROM), block erasable or "FLASH" EEPROM, and nonvolatile RAM (NVRAM). Using floating-gate transistors, the state of the memory cell is determined by the charge on the floating gate. This charge is usually formed by applying a voltage which exceeds the normal power supply voltage for a certain length of time, typically on the order of a few milliseconds. After the floating-gate transistors are programmed, the logic state cannot be determined easily, by optical inspection. This floating gate memory will preferably be implemented using the same array and high-voltage programming circuitry used for other nonvolatile memory within the integrated circuit. A portion of a data processor 120 having such a memory is shown in FIG. 2. Elements in common with data processor 20 of FIG. 1 are given the same reference numbers. Data processor 120 includes a CPU core 121 with a floating-gate nonvolatile memory 122, a portion of which determines the encryption for off-chip addresses and is thereby coupled to the first input terminal of AND gate 52. The remainder of data processor 120 not shown in FIG. 2 may be implemented by the circuit shown in FIG. 1-2. If even further protection is desired, however, the nonvolatile memory may be one-time programmable (OTP) to prevent experimental determination of the encryption patterns.

Data encryption-decryption circuit 60 includes two ROMs 61 and 62 and logic circuits 70 and 80. ROM 61 is a 256-by-8 ROM having an address input connected to internal address bus 22 for receiving address bits IA8–IA15, and an eight-bit data output. Likewise ROM 62 is also a 256-by-8 ROM having an address input connected to internal address bus 22 for receiving the lower portion of the address, namely address bits labelled "IA0–IA7", and an eight-bit data output.

Logic circuit 70 includes logic circuitry which implements the data encryption-decryption based on the address at which the data is located. Logic circuit 70 includes eight exclusive-OR gates and eight AND gates which are connected in a similar configuration. This configuration will be described with respect to the encryption-decryption of an internal data signal labelled "ID7" and a corresponding data signal conducted to an external data bus labelled "D7". A first exclusive-OR gate 71 has a first terminal connected to the most-significant output terminal of ROM 61, a second input terminal connected to the most-significant output terminal of ROM 62, and an output terminal. A first AND gate 72 has a first input terminal connected to the output terminal of exclusive-OR gate 71, a second input terminal for receiving signal $\overline{\text{BYPASS}}$, and an output terminal connected to logic circuit 80.

Logic circuit 80 includes buffers 81 and 82, exclusive-OR gates 83 and 84, and buffers 85 and 86. Buffer 81 has an input terminal for receiving signal D7, a control input terminal (not shown) for receiving a read/write signal, and an output terminal. Buffer 82 has an input terminal, a control input terminal (not shown) for receiving a complement of the read/write signal, and an output terminal connected to the signal line of the external data bus conducting signal D7. Exclusive-OR gate 83 has a first input terminal connected to the output terminal of AND gate 72, a second input terminal, and an output terminal connected to the input terminal of buffer 82. Exclusive-OR gate 84 has a first input terminal connected to the output terminal of buffer 81, a second input terminal connected to the output terminal of AND gate 72, and an output terminal. Buffer 85 has an input terminal connected to the output terminal of exclusive-OR gate 84, a control input terminal (not shown) for receiving the complement of the read/write signal, and an output terminal connected to the signal line of internal data bus 23 conducting signal ID7. Buffer 82 has an input terminal connected to the signal line of internal data bus 23 conducting signal, a control input terminal (not shown) for receiving the read/write signal, and an output terminal connected to the second input terminal of exclusive-OR gate 83.

When signal $\overline{\text{BYPASS}}$ is active, data encryption-decryption circuit 60 does not perform encryption or decryption of data, i.e., transmits or receives data as "cleartext". The logic low of signal $\overline{\text{BYPASS}}$ causes AND gate 72 to provide a logic low. The logic low on the output terminal of AND gate 72 causes exclusive-OR gates 83 and 84 to function as noninverting buffers, i.e., the logic levels on their other input terminals are reflected on their output terminals. During a read cycle, the read/write signal is in a logic state to make buffers 81 and 85 conductive and buffers 82 and 86 nonconductive and thus signal ID7 is provided from signal D7 unaltered. During a write cycle, the read/write signal is in a logic state to make buffers 81 and 85 nonconductive and buffers 82 and 86 conductive and thus signal D7 is provided from signal ID7 unaltered.

When signal BYPASS is inactive, data encryption-decryption circuit 60 performs encryption or decryption of data depending on whether the cycle is a write cycle or a read cycle, respectively. The logic high of signal BYPASS causes AND gate 72 to provide its output at a logic state determined by the output of exclusive-OR gate 71, i.e., in dependence on the exclusive-OR of two ROM outputs. This logic state will then cause exclusive-OR gates 83 and 84 to alternatively function as noninverting or inverting buffers, and the logic states provided from the external data bus to internal data bus 23 during a read cycle, or from internal data bus 23 to the external data bus, will depend thereon.

Address encryption or scrambling is performed by address encryption circuit 100 which includes two ROMs 101 and 102, a multiplexer (MUX) 103, and a set of buffers 110. ROMs 101 and 102 have address input terminals connected to a respective half of internal address bus 22, and output terminals connected to a first input terminal of MUX 103. ROMs 101 and 102 are each 256-by-8 ROMs. MUX 103 has a first 16-bit input terminal connected to the data output terminals of ROMs 101 and 102, a second 16-bit input terminal connected to internal address bus 22, a control input terminal for receiving signal BYPASS, and a 16-bit output terminal. Connected to the output terminal is a corresponding set of 16 buffers, including a representative buffer 115. Buffer 115 has an input terminal connected to a corresponding signal of the output terminal of MUX 103, in this case the one corresponding to external address signal A7, and an output terminal connected to the signal line of the external address bus conducting signal A7.

While the invention has been described in the context of a preferred embodiment, it will be apparent to those skilled in the art that the present invention may be modified in numerous ways and may assume many embodiments other than that specifically set out and described above. For example while the present invention was illustrated in the context of a microcontroller, it should be apparent that the disclosed flexible encryption technique is applicable to a data processor which cannot be classified as a microcontroller. Furthermore other encryption technqiues may be used as well. Accordingly, it is intended by the appended claims to cover all modifications of the invention which fall within the true spirit and scope of the invention.

We claim:

1. In a data processing system having an external memory for storing a first plurality of instructions, an integrated circuit data processor with flexible data encryption comprising:

a central processing unit core having an address output coupled to an internal address bus, and a bidirectional data terminal coupled to an internal data bus;

a floating-gate nonvolatile memory coupled to said internal address bus and to said internal data bus; and a data encryption-decryption circuit having a first terminal coupled to said internal data bus, a second terminal coupled to an external data bus, and a control input terminal for receiving a bypass signal, wherein said data encryption-decryption circuit performs encryption when data is provided from said internal data bus to said external data bus and decryption when data is provided from said external data bus to said internal data bus, selectively in response to said bypass signal;

said floating-gate nonvolatile memory having a first portion which provides said bypass signal at a logic state corresponding to a data bit selected by an address conducted on said internal address bus, and a second portion which stores a second plurality of instructions, said central processing unit core executing a program comprising said first and second pluralities of instructions.

2. The data processor of claim 1 wherein said floating-gate nonvolatile memory comprises erasable programmable read only memory (EPROM).

3. The data processor of claim 2 wherein said floating-gate nonvolatile memory further comprises electrically erasable programmable read only memory (EEPROM).

4. The data processor of claim 3 wherein said floating-gate nonvolatile memory further comprises block erasable EEPROM.

5. The data processor of claim 1 wherein said floating-gate nonvolatile memory is characterized as being one-time programmable.

* * * * *